(No Model.)

J. P. WELSHANS.
STOVE TOOL.

No. 310,003. Patented Dec. 30, 1884.

WITNESSES:
Donn Twitchell
C. Sedgwick

INVENTOR:
J. P. Welshans
BY Munn & Co
ATTORNEYS.

UNITED STATES PATENT OFFICE.

JACOB P. WELSHANS, OF MONTEZUMA, INDIANA.

STOVE-TOOL.

SPECIFICATION forming part of Letters Patent No. 310,003, dated December 30, 1884.

Application filed June 4, 1884. (No model.)

*To all whom it may concern:*

Be it known that I, JACOB P. WELSHANS, of Montezuma, in the county of Parke and State of Indiana, have invented a new and Improved Stove-Tool, of which the following is a full, clear, and exact description.

My invention consists in an implement adapted for use as a poker and lid-lifter, and for a fire-kindler and a torch, as hereinafter described and claimed.

Reference is to be had to the accompanying drawings, forming a part of this specification, in which similar letters of reference indicate corresponding parts in both figures.

Figure 1:
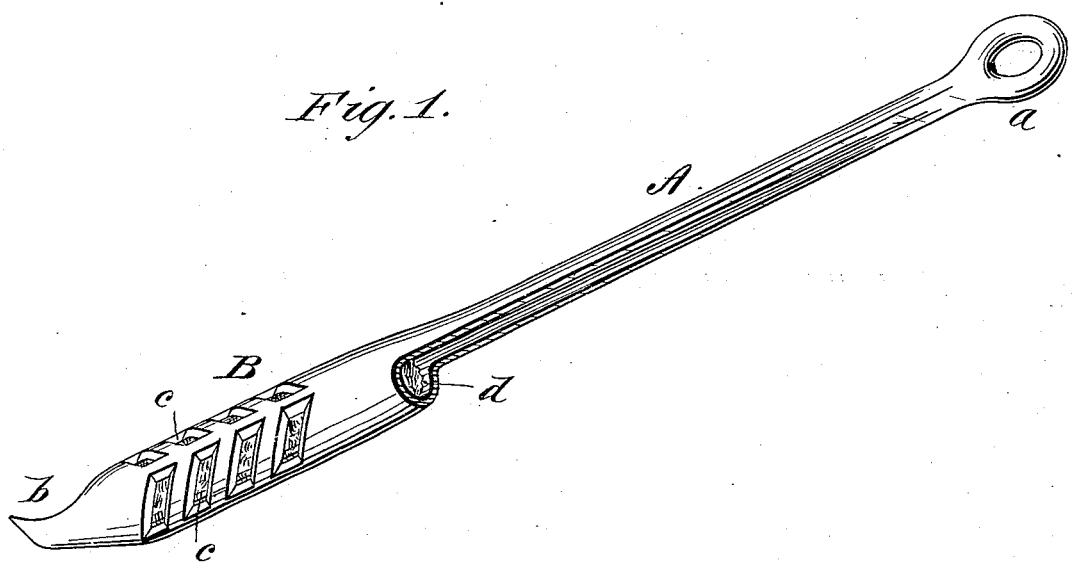
Figure 2:
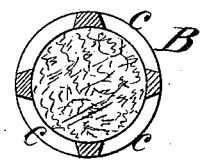

Figure 1 is a perspective view of the implement, and Fig. 2 is a cross-section of the same.

The tool or implement is preferably made of malleable cast-iron. It consists of a handle portion, A, formed with an eye, *a*, and a hollow or tubular portion or head, B, that terminates in a hook or bent point, *b*. The hollow head B has side slots, *c*, for a portion of its length, and an end opening at *d*. The head B is filled with asbestus packed in through the opening *d*; or in place of asbestus any incombustible material that will absorb oil may be used, and a suitable cement is used to keep the material in place.

This implement is adapted for use as a lid-lifter, door-opener, and poker, and as a fire-kindler and torch. For use to kindle fires, the head B is plunged into oil or any combustible liquid to allow the packing to absorb the liquid, and it is then to be rolled in ashes, and in that condition can be readily ignited and inserted in the stove, or used as a torch for burning brush, caterpillars on trees, or for illumination at night. The rear portion of the head not slotted serves as a reservoir to retain oil that is given out gradually.

Having thus described my invention, I claim as new and desire to secure by Letters Patent—

A combined stove-tool and fire-kindler, consisting of a handle and a hollow head, B, provided with openings *c*, and terminating in a lifting-hook, *b*, substantially as set forth.

JACOB P. WELSHANS.

Witnesses:
JOHN OSBORN,
JOHN HORN.